United States Patent
Ling et al.

(10) Patent No.: US 11,303,361 B2
(45) Date of Patent: Apr. 12, 2022

(54) SINGLE PHOTONS SOURCE AND KEY DISTRIBUTION

(71) Applicant: National University of Singapore, Singapore (SG)

(72) Inventors: Euk Jin Alexander Ling, Singapore (SG); Robert Bedington, Singapore (SG); James Anthony Grieve, Singapore (SG)

(73) Assignee: National University of Singapore, Singapore (SG)

(*) Notice: Subject to any disclaimer, the term of this patent is extended or adjusted under 35 U.S.C. 154(b) by 0 days.

(21) Appl. No.: 16/960,641

(22) PCT Filed: Jan. 15, 2019

(86) PCT No.: PCT/SG2019/050024
§ 371 (c)(1),
(2) Date: Jul. 8, 2020

(87) PCT Pub. No.: WO2019/139544
PCT Pub. Date: Jul. 18, 2019

(65) Prior Publication Data
US 2021/0006337 A1 Jan. 7, 2021

(30) Foreign Application Priority Data
Jan. 15, 2018 (SG) .......................... 10201800330P

(51) Int. Cl.
*H04B 10/00* (2013.01)
*H04B 10/70* (2013.01)
(Continued)

(52) U.S. Cl.
CPC ........... *H04B 10/70* (2013.01); *G02F 1/3551* (2013.01); *H01S 3/1024* (2013.01); *H04B 10/1121* (2013.01); *H04B 10/85* (2013.01)

(58) Field of Classification Search
CPC ... H04B 10/11; H04B 10/112; H04B 10/1121; H04B 10/1123; H04B 10/1125;
(Continued)

(56) References Cited

U.S. PATENT DOCUMENTS 7,805,079 B1   9/2010 Meyers et al.
9,143,266 B2   9/2015 Mower et al.
(Continued)

FOREIGN PATENT DOCUMENTS

WO   2018108619 A1   6/2018

OTHER PUBLICATIONS

Vergoossen et al., "Satellite Quantum Communications When Man-in-the-Middle Attacks are Excluded," Entropy, 2019, 21, 387.
(Continued)

*Primary Examiner* — Daniel G Dobson
(74) *Attorney, Agent, or Firm* — Michael Best & Friedrich LLP

(57) ABSTRACT

A method of key distribution, a key distribution system, a single photon source system and a method of generating single photons. The method of key distribution comprises the steps of: providing a free space optics, FSO, link between a transmitter and a receiver; detecting whether an eavesdropper is present along the FSO link; transmitting individual photons or weak coherent pulses, as an approximation of individual photons, each encoding a basic unit of the key according to a binary or higher number base system from the transmitter to the receiver; and comparing timing information associated with the transmission and reception of the individual photons for determining the key when it is detected that no eavesdropper is present along the FSO link.

12 Claims, 5 Drawing Sheets

(51) Int. Cl.
*G02F 1/355* (2006.01)
*H01S 3/102* (2006.01)
*H04B 10/112* (2013.01)
*H04B 10/85* (2013.01)
*H04J 14/00* (2006.01)

(58) Field of Classification Search
CPC ............ H04B 10/1127; H04B 10/1129; H04B 10/114; H04B 10/1141; H04B 10/1143; H04B 10/1149; H04B 10/116; H04B 10/118; H04B 10/70; H04B 10/85
See application file for complete search history.

(56) References Cited

U.S. PATENT DOCUMENTS

| | | |
|---|---|---|
| 2002/0097874 A1 | 7/2002 | Foden et al. |
| 2009/0190759 A1 | 7/2009 | Peev et al. |
| 2011/0013906 A1 | 1/2011 | Stevenson et al. |
| 2014/0321649 A1 | 10/2014 | Englund et al. |
| 2016/0234017 A1* | 8/2016 | Englund ............ H04B 10/0795 |
| 2017/0338951 A1* | 11/2017 | Fu ........................ H04L 9/3236 |

OTHER PUBLICATIONS

International Search Report and Written Opinion for Application No. PCT/SG2019/050024 dated Apr. 2, 2019 (11 pages).
European Patent Office Extended Search Report for Application No. 19738674.1 dated Sep. 24, 2021 (11 pages).
Fasel et al., "High quality asynchronous heralded single photon source at telecom wavelength," ARXIV.ORG, Cornell University, Aug. 20, 2004.

* cited by examiner

SINGLE PHOTONS SOURCE AND KEY DISTRIBUTION

CROSS REFERENCE TO RELATED APPLICATIONS

This application is a national stage filing under 35 U.S.C. § 371 of International Patent Application No.: PCT/SG2019/050024, filed Jan. 15, 2019, which claims priority to Singapore Patent Application No. 10201800330P, filed Jan. 15, 2018, the entire contents of all of which are hereby incorporated by reference herein.

FIELD OF INVENTION

The present invention relates broadly to a single photons source and to key distribution, and specifically to a method and system for key distribution, and to a single photons source system and a method for generating a single photons output.

BACKGROUND

Any mention and/or discussion of prior art throughout the specification should not be considered, in any way, as an admission that this prior art is well known or forms part of common general knowledge in the field.

The most secure form of physical distribution for encryption keys today is described by a family of optical techniques called Quantum Key Distribution (QKD). The canonical QKD protocol is called BB84 (named after the invention year and the inventors C. Bennett and G. Brassard), which has inspired a number of variants.

The original BB84 protocol derives an encryption key by using polarization states of light transmitted and detected via individual photons. The protocol assumes that the path taken by the photons is completely insecure, and that an eavesdropper can be a "man-in-the-middle" who is actively intercepting and re-sending photons, and may perform any number of measurements or manipulations in between. The BB84 protocol detects the presence of this eavesdropper by comparing the error rates between transmitted and received polarization states. In practice, this is performed on a random sub-set of the signals at the receiver. The man-in-the-middle causes an increase in error rates because the transmitter randomly encodes the encryption key into two orthogonal polarization bases. The use of the two polarization bases means that transmitter and receiver must be capable of measuring four polarization states. This minimum complexity is necessary to defeat the eavesdropper who must guess the correct bases for his cloning or sampling activities.

The communication about error rates is performed via an unencrypted but authenticated communication channel, often referred to as a "classical channel". The authentication is important as it prevents the eavesdropper from playing the "man-in-the-middle" in the classical channel. If there is also a man-in-the-middle present in the classical channel, then no key derivation can be achieved. These are common features of the entire class of QKD techniques, even if the encoding is done in other degrees-of-freedom e.g. phase, wavelength, time-bins. In particular, the path taken by the photons is completely abstract; it can be via fiber, free-space or special memory devices transported via a physical courier.

Despite operating under an extremely paranoid threat model, QKD has been shown to be technically feasible, and has been demonstrated a number of times.

QKD can be performed using Free Space Optics (FSO) technology, where telescopes at two sites are co-aligned, and used to transmit and receive quantum signals. In this scenario, the sender and receiver terminals must be in constant line-of-sight, and can assure themselves by visual inspection (or auxiliary sensor systems) that there is no eavesdropper compromising the FSO link directly. By its very nature, FSO imposes a level of access control on the optical/quantum link. When access control is taken into account, it is apparent that an eavesdropper cannot covertly have complete access to the FSO link. In other words, the "man-in-the-middle" is not a required component in a threat model constrained to FSO based key distribution. Eavesdroppers are limited to the receipt of photons that have been scattered by the atmosphere. These scattered photons no longer reach the intended receiver, but could conceivably be collected by an eavesdropper. This is sometimes described in the literature as a "beamsplitter attack".

Embodiments of the present invention seek to provide a different form of key distribution, utilizing a threat model that is different from that used in standard QKD, with correspondingly modified hardware and protocols.

SUMMARY

In accordance with a first aspect of the present invention, there is provided a method of key distribution comprising the steps of: providing a free space optics, FSO, link between a transmitter and a receiver; detecting whether an eavesdropper is present along the FSO link; transmitting individual photons or weak coherent pulses, as an approximation of individual photons, each encoding a basic unit of the key according to a binary or higher number base system from the transmitter to the receiver; and comparing timing information associated with the transmission and reception of the individual photons for determining the key when it is detected that no eavesdropper is present along the FSO link.

In accordance with a second aspect of the present invention, there is provided a key distribution system comprising: a transmitter; a receiver; and a free space optics, FSO, link between the transmitter and the receiver; wherein the transmitter is configured to transmit individual photons or weak coherent pulses, as an approximation of individual photons, each encoding a basic unit of the key according to a binary or higher number base system from the transmitter to the receiver; and wherein the system further comprises a key determination unit configured to compare timing information associated with the transmission and reception of the individual photons for determining the key when it is detected that no eavesdropper is present along the FSO link.

In accordance with a third aspect of the present invention, there is provided a single photon source system comprising: a source unit for generating photon pairs using Spontaneous Parametric Downconversion, SPDC; and a timing unit for generating timing information associated with the generation of the photon pairs; wherein the single photon source system is configured to transmit only one of the photons from each pair as an output of the single photon source system.

In accordance with a fourth aspect of the present invention, there is provided a method of generating single photons, the method comprising the steps of: generating photon pairs using Spontaneous Parametric Downconversion, SPDC; generating timing information associated with the generation of the photon pairs; and transmitting only one of the photons from each pair as an output.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1:
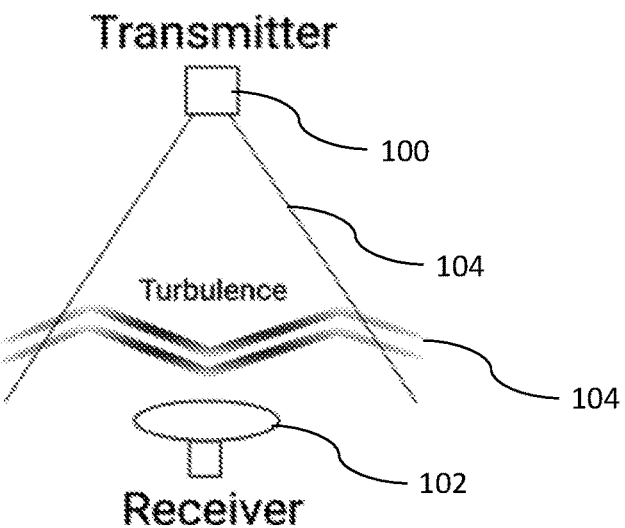
FIG. 1 is a schematic drawing of a transmitter and receiver configuration illustrating key distribution according to an example embodiment.

Embodiments of the present invention are described herein in the context of a Free Space Optics (FSO) link employing direct surveillance (optical or otherwise) of the optical path, yielding that no man-in-the-middle attack is possible. It has been recognized by the inventors that the requirements on QKD type key distribution apparatus and method can be relaxed accordingly. In particular, the key distribution apparatus and method only needs to transmit and receive in one basis according to example embodiments (for example, a single pair of orthogonal polarization states in one embodiment). The use of only two states as opposed to four greatly reduces the complexity of the system, and may increase the rate by up to a factor of two compared to conventional QKD systems. An attempted beamsplitter attack is defeated according to example embodiments by encoding using individual photons. As any scattered photons will not contribute to the final encryption key, these photons are of no value to the eavesdropper. In contrast, were bits to be encoded into multi-photon pulses, multiple copies of each bit would be in existence. An eavesdropper may be able to collect some of these copies scattered from the FSO link. This would enable the eavesdropper to unambiguously determine the associated bit without being detected by the key distribution system.

Single Photon Key Distribution (SPKD) according to an example embodiment is a system for secure distribution of encryption keys in an FSO environment where the encoding is performed at the single photon level. This system according to an example embodiment is built around a different threat model compatible with the strict and line-of-sight requirement for FSO communication. The system according to an example embodiment can comprise a single photon source in which bits are encoded in one basis (for example, two polarization states), an FSO link for transmission of single photons, apparatus for directly detecting (by optical or other means) a "man-in-the-middle" attack and a receiver unit with single photon detectors. Examples of the transmitter and receiver apparatus for use in example embodiments will be described below.

SPKD according to example embodiments departs from traditional QKD in one or more of the following assumptions recognized by the inventors.

a. Using FSO technology requires line-of-sight between two parties. Hence, the user can satisfy themselves via visual (or other direct) inspection that there is no intermediate eavesdropper.
b. The users are not limited to only visual inspection. They can also utilize any number of occlusion-detection technologies, such as, but not limited to, radar/lidar. These technologies span a broad range of the electromagnetic spectrum, and makes the use of cloaking technology difficult.
c. The threat model for FSO based key distribution is different from the conventional threat model underpinning conventional QKD protocols.
d. In this different threat model, the primary information leakage is via scattering of photons away from the intended receiver. The scattered photons may be assumed to be wholly intercepted by an eavesdropper without compromising the transmitted key
e. That FSO based key distribution can still be secure, despite not adopting a full QKD protocol, provided that the encoding is into a stream of individual single photons.
f. That the encoding can be done in a single polarization basis of the photons. This does not preclude the use of encoding in other degrees-of-freedom, as long as the encoding is done using individual photons.

Three sources of single photons for use in example embodiments are described below in detail. This does not preclude the use of other types of light sources that provide, or approximately provide, single photon output. The single photons sources described herein in detail are themselves of value in other applications such as timing synchronisation or random number generation.

The primary constraint on the eavesdropper according to example embodiments is the requirement of line-of-sight between FSO platforms—if the two users can for example, not limited to, visually observe and authenticate each other (via visual cues, tracking beacons or other means), they can be assured there is no man-in-the-middle. For ad-hoc FSO networks between moving platforms in maritime, airborne or ground environments, the inventors have recognized the further constraint that it is unlikely for an eavesdropper to be able to predict each instance of an ad-hoc network, nor how the nodes in that network are going to behave.

In particular, the use of optical tracking beacons in example embodiments for high reliability FSO communications enables the two parties to create situational awareness about the quality of the optical link. These optical tracking beacons are typically lasers with a different wavelength, co-propagating with the quantum signal. An interception apparatus on the quantum signal will necessarily affect the optical beacon. Furthermore, the users could install occlusion-detection technology on the nodes in example embodiments to identify non-visual obstructions in the beam path; examples of such technology, but not by way of limitation, are radar or lidar, or visual inspection augmented with Artificial Intelligence capability.

As illustrated in FIG. 1, Single Photon Key Distribution according to an example embodiment between a transmitter 100 and a receiver 102 is performed using free-space optics. The transmitter 100 emits an encryption key whose individual bits are encoded into separate single photons and beamed via a telescope to the receiver 102. The line-of-sight requirement of the FSO link allows for the detection of an eavesdropper directly by e.g. optical (e.g. visual) or other means. This direct detection system can be operated in parallel to the transmitter/receiver devices 100, 102, according to example embodiments, or can be incorporated into their optical systems. The beam will diffract (spread out) on its way to the receiver 102, as indicated at numeral 104. Under ideal conditions, such as in space, there will be no turbulence or scattering. Within the atmosphere (lines 106 near the receiver 102), there will be scattering, but ballistic photons will still reach the receiver 102. Only these ballistic photons will contribute to the final encryption key. Embodiments of the present invention exploit that in such an FSO scheme, an eavesdropper does not have unfettered access to all the photons from the transmitter. Instead, a realistic threat model is that the eavesdropper: a) receives all scattered photons, or b) employs electromagnetic eavesdropping to obtain an understanding of the encoding/decoding process within the transmitter 100 and receiver 102. This model is also valid for all FSO based key distribution that takes place within the atmosphere.

In the scenario for key distribution between satellites and ground (for both uplink and downlink configurations), or between satellites, the paths of the platforms are fixed by orbital mechanics. In this case, the eavesdropper has some predictive power and can attempt to intercept the quantum link either in space, or within the atmosphere. In such embodiments, a different type of constraint can be imposed because of the presence of auxiliary systems. An attempt to fly an object in space for interception will primarily be revealed by Space Situational Awareness technology. Objects in space are tracked and assigned unique identifiers, sometimes called the Two Line Element (TLE) that predict the future path of the object. Such databases are publicly searchable and available from various national or supranational organisations. It is unlikely that a space-based interceptor will not be detected, tagged and identified by these independent efforts. Interceptors within the atmosphere are possible—however, the useable atmosphere for aircraft is only about 20 km, and visual inspection technology or auxiliary sensors like radar/lidar will be able to operate over that range according to example embodiments.

One viable route for an eavesdropper is the so-called "beamsplitter" attack where part of the photon stream is diverted to an eavesdropping apparatus. This can be a viable attack model because the atmospheric fluctuations can scatter photons. Indeed, for this reason, it is deemed unsuitable by the inventors to assume that standard laser communication can be used to distribute a very private encryption key; laser pulses are composed of large numbers of identical pulses, and just the detection of one photon that has been split is sufficient to inform the eavesdropper the full information content of the pulse (as described earlier for multi photon pulses).

However, if the key distribution is conducted by a stream of single photons (each photon encoding one bit) according to example embodiments, then much stronger security is available. This is because single photons travelling through the atmosphere can only be measured once, i.e. they cannot be detected by both the eavesdropper and the intended receiver. In SPKD according to example embodiments, each bit of the encryption key is encoded into an individual photon for transmission.

Figure 2:
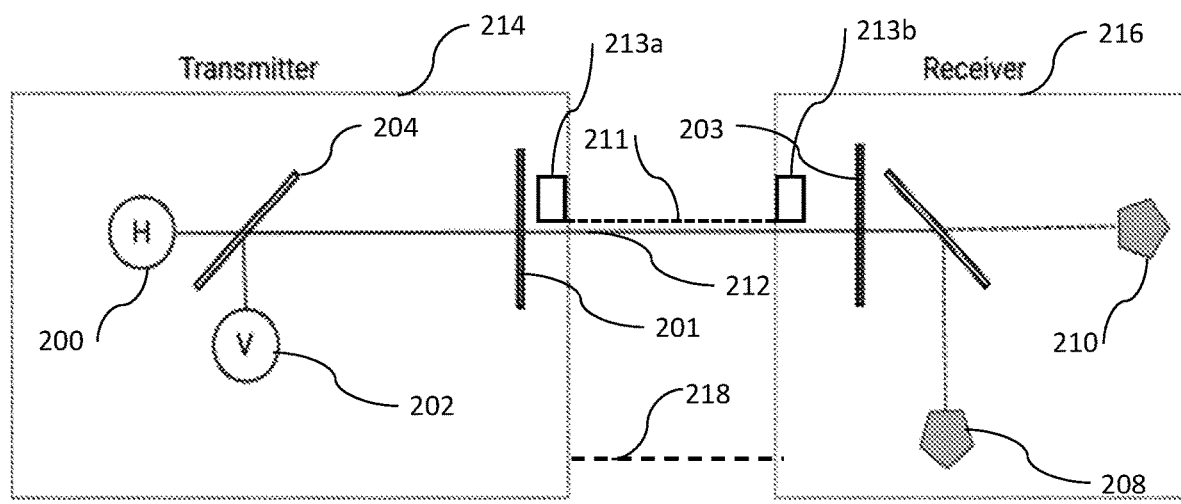
FIG. 2 is a schematic drawing of a transmitter and receiver configuration illustrating key distribution according to an example embodiment.

Therefore, for SPKD according to example embodiments to be secure bits of the transmitted key are carried by individual photons. As illustrated in FIG. 2, the transmitted key is a random string of 0s and 1s, and this can be encoded into two polarization states of the photon, such as Horizontal (H) and Vertical (V) respectively. This is not a unique choice; any unique pair of orthogonal polarization states can be used in example embodiments, described by a Poincare Sphere. Just before transmission, the linear polarization can be converted into circular polarization using a quarter-wave plate 201 to increase tolerance to rotation. It is noted that any elliptical polarization state close to the Circular polarization states will also impart increased tolerance to rotational error according to example embodiments. Furthermore, embodiments of the present invention are not restricted only to the use of polarization; any suitable degree-of-freedom where a basis can be implemented can be used in example embodiments. Examples of other degrees-of-freedom include, but are not limited to, wavelength (color) or phase. An example of wavelength-based encoding according to an embodiment of the present invention is described below.

The single photon sources 200, 202 can be implemented in a variety of ways using solid state "artificial atoms", or heralded single photon sources. In the embodiment shown in FIG. 2, a polarization plate 204 is used for combining two orthogonal polarization states, and quarter-wave plates 201, 203 are used to rotate the single photon into, and out of, the circular polarization bases. A polarization splitter 206 is used to direct Horizontal and Vertical polarized photons to the appropriate detectors 208, 210. The receiver 216 records the timing of the arrival of photons, and the timing is compared with the timing information associated with the transmission of the photons at the transmitter 214. The comparison processing uses an authenticated communication channel 218 between the transmitter 214 and the receiver 216.

An optical beacon indicated at numeral 211) from a beacon system 213a,b is assumed to be co-propagating with the single photons (indicated at numeral 212) between transmitter 214 and receiver 216.

Embodiments of the present invention can use any single photon source. At present, most of these sources described in the literature are at a very low Technology Readiness Level, and not yet readily suitable for integration into devices. Accordingly, alternative designs for single photon sources based on the concept of Spontaneous Parametric Downconversion (SPDC) are described herein. On their own, these single photon sources according to example embodiments are also useful for other applications such as random number generation or clock synchronisation.

Embodiment 1: The Heralded Single Photon Source

A mature technology is the heralded single photon source. In this technology, a pair of photons are generated via Spontaneous Parametric Downconversion (SPDC) in a birefringent material, obeying energy and momentum conservation. When one of the photons is detected early this signal is used to "herald" the presence of the other photon according to an example embodiment. With this source, end-users in SPDK according to example embodiments are able to agree on the detection of pairs of photons. Typically, the photon-pair production process is very strongly correlated in polarization and color. Co-polarized (Type-1), collinear propagating and non-degenerate (two different colors) SPDC are utilized according to an example embodiment.

Figure 3:
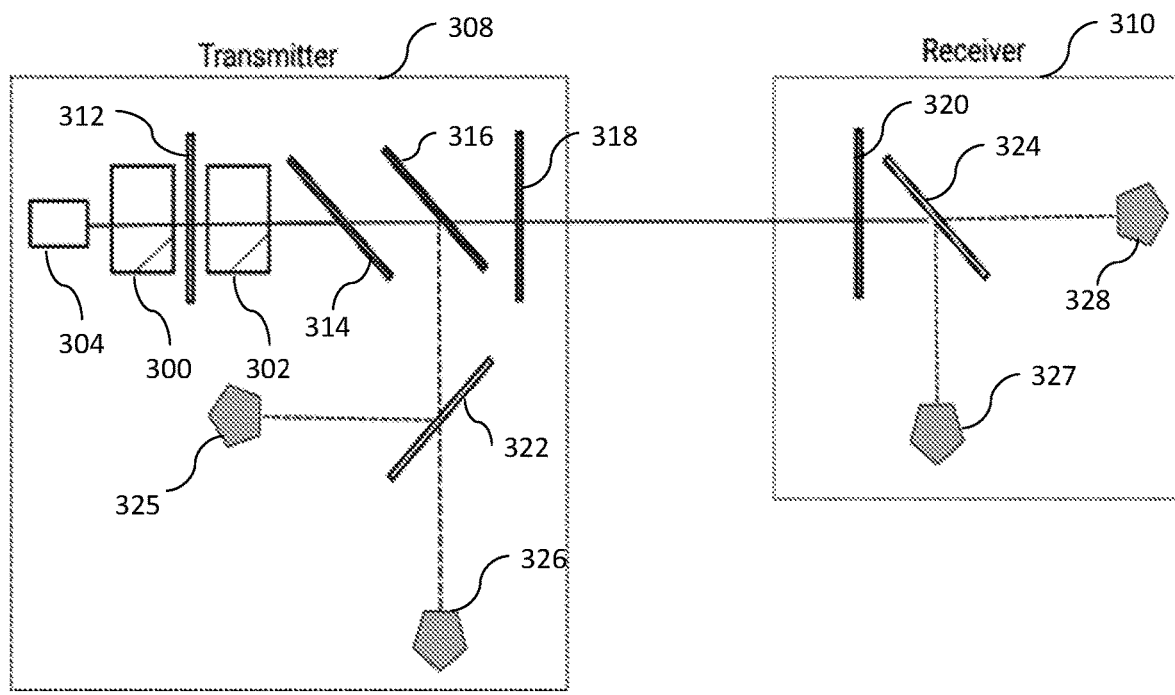
FIG. 3 is a schematic drawing of a transmitter and receiver configuration illustrating key distribution according to an example embodiment and single photons output generation according to an example embodiment.

By arranging two nonlinear optical crystals 300, 302 as shown in FIG. 3, pairs of photons co-polarized in Horizontal or Vertical Polarization states are generated. These crystals 300, 302 may be constructed from beta-Barium Borate (BBO) or any other suitable nonlinear material. The pump beam 304 can be obtained from any suitable continuous-wave light source; there are no limitations on the wavelength bandwidth of the pump beam 304.

The layout of the photon source as the transmitter 308 for SPKD is shown in FIG. 3, together with the receiver 310 for SPKD, according to an example embodiment. A half-wave plate 312 for the SPDC photons generated in the first nonlinear optical crystal 300 is provided. A beam dump 314 is provided for the pump beam 304. A dichroic mirror 316 is provided to remove the heralding photon. Quarter-wave plates 318, 320 are provided to rotate the heralded photon into, and out of, the circular polarization bases. Polarization splitters 322, 324 are provided to direct Horizontal and Vertical polarized photons to the appropriate detectors 325-328. The pump beam 304 is obtained from a light source 330 just before the first nonlinear optical crystal 300. An optical beacon (not shown) is assumed to be co-propagating with the single photons between transmitter 308 and receiver 310, as has been described above with reference to FIG. 2.

Two nonlinear optical crystals 300, 302 are used whose optical axes are co-aligned (see the sloped line in the relevant boxes indicating the optical axes co-alignment). By inserting a suitable half-wave element 312 in between the nonlinear optical crystals 300, 302, the pump polarization can remain un-rotated while the polarization of the photon pairs from the first crystal 300 is rotated by 90 degrees. In this way, at the output of the second nonlinear optical crystal 302, there is a mixture of photon pairs with different polarisation states, respectively. Specifically, approximately half of the photon pairs are in the Horizontal polarization state, while the other half are in the Vertical polarization state.

As the photons of each pair are of two different colors, half of each pair can be diverted by the dichroic element 316 to a pair of single photon detectors 325, 326 which are used to herald the presence of the transmitted photons. Just before transmission, the quarter-wave plate 318 can be used to rotate the polarization of the photons to Left or Right Circular polarization. This is reversed by the quarter-wave plate 320 at the receiver 310 just before the detectors 327, 328.

The receiver 310 records the timing of the arrival of photons, and compares the timing with the recorded detection of the heralding photons at the transmitter 308 via an authenticated communication channel (compare numeral 218 in FIG. 2). Preferably, the users never reveal which detector fired, restricting their discussion to the timing information according to example embodiments. Unlike standard QKD, there is no basis reconciliation or sifting required in example embodiments. Instead, users proceed directly to the error-correction and privacy amplification steps of QKD, which are understood in the art and will not be described herein in detail. The privacy amplification will differ from standard QKD according to example embodiments, namely the errors observed in SPKD need not be attributed to interference by an eavesdropper. Thus, privacy amplification preferably will only need to compress the parity bits revealed in the error correction process, leading to a larger size of the final key. This is an additional advantage of embodiments of the present invention.

The use of right and left circulation polarization states according to the example embodiment is intended to increase the tolerance to uncompensated relative rotation between the transmitter 308 and receiver 310. This does not preclude the use of other polarization states, as long as the two states are orthogonal to each other. For example, suitable the quarter-wave plates could be used to generate (and reverse) elliptical states very close to the ideal right/left circular polarizations in different embodiments. These elliptical states also impart increased tolerance to reference frame rotation, and in any case, is most likely to be the situation in any actual implementation due to the manufacturing tolerance of the quarter-wave plate 318, 320.

It is noted that heralded single photon sources based on SPDC have the possibility of producing multiple pairs at the same time. However, this probability is very low. Typically the SPDC efficiency is 1E-9 per pump photon per mm, and to produce a multiple pair event, the probability is the square of 1E-9, i.e. 1E-18. The use of CW pump lasers as the source 330 according to an example embodiments is unlikely to lead to a serious multi-pair effect, as will be appreciated by a person skilled in the art.

Embodiment 2: The Pulsed Pair Source

Figure 4:
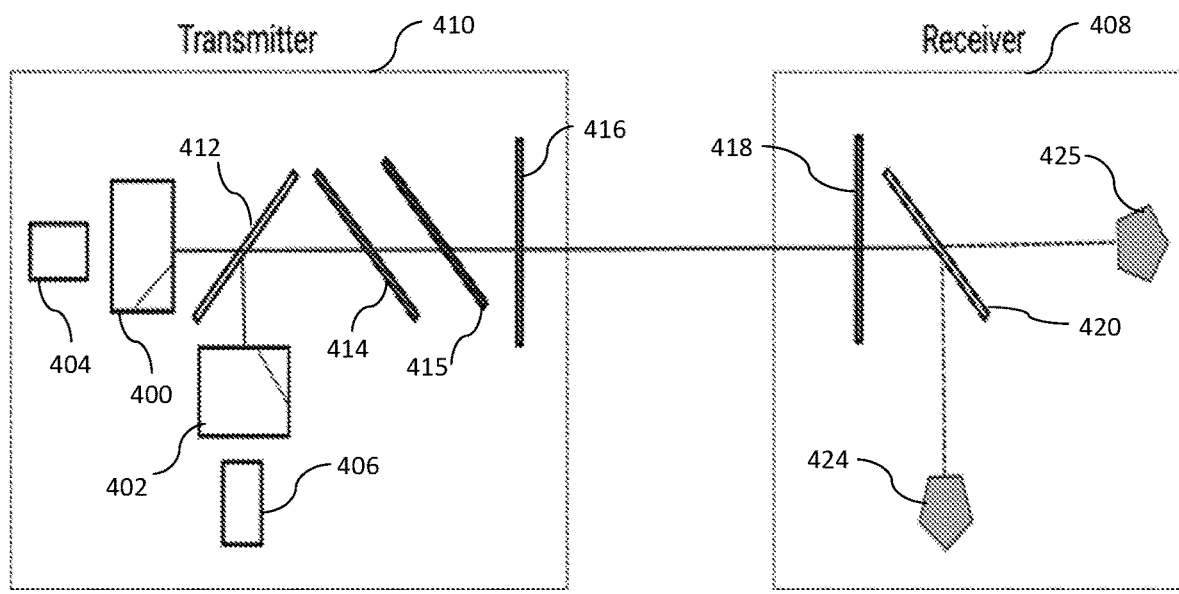
FIG. 4 is a schematic drawing of a transmitter and receiver configuration illustrating key distribution according to an example embodiment and single photons output generation according to an example embodiment.

In an alternative embodiment of a single photon source the two crystals 400, 402 are arranged separately such that each crystal 400, 402 has its own separate pump device 404, 406, as shown in FIG. 4. In this embodiment, the pump devices 404, 406 are pulsed randomly, producing the two polarization states randomly but with equal probability. Instead of heralding the presence of the single photon, one half of each photon pair is discarded; only a fraction of these may be saved for analysis and monitoring purposes. For example, identification of rate fluctuations and confirmation of crystal alignment are statistical measurements that would only require a fraction of the dumped photons to be used. The other half of each photon pair are then transmitted to the receiver 408.

The layout of the photon source as the transmitter 410 for SPDK is shown in FIG. 4, together with the receiver 408 for SPDK, according to an example embodiment. A polarization element 412 is provided for combining the SPDC emission from the two nonlinear optical crystals 400, 402. Each crystal 400, 402 has its own pump device 404, 406. A beam dump 414 is provided for the pump. A dichroic mirror 415 is provided to remove the heralding photon (i.e. to remove one half of each photon pair). Quarter-wave plates 416, 418 are provided to rotate the heralded photon into, and out of, the circular polarization bases. A polarization splitter 420 is provided to direct Horizontal and Vertical polarized photons to the appropriate detectors 424, 425. An optical beacon (not shown) is assumed to be co-propagating with the single photons between transmitter 410 and receiver 408, as described above with reference to FIG. 2.

As shown in FIG. 4, there are two nonlinear optical crystals 400, 402, each with its own pump device 404, 406. The crystals 400, 402 are configured such that one produces horizontally polarized photon pairs; the other produces vertically polarized photon pairs. The pump devices 404, 406 are activated randomly. To ensure that only a single photon is transmitted at any time, half of each pair of photons is removed by the dichroic mirror 415. Other parts of the transmission and detection process are identical to that described for the embodiment shown in FIG. 3. An advantage of the embodiment shown in FIG. 4 is that the transmitter 410 may dispense with the use of single photon detectors and precise time-stamping electronics which are often a limiting factor on power-sensitive mobile platforms, as timing information is available directly from the pump device. The receiver 408 records the timing of the arrival of photons, and compares the timing with the recorded generation timing of the heralding photons at the transmitter 410 via an authenticated communication channel (compare numeral 218 in FIG. 2).

Embodiment 3: SPDK Based on Color Encoding

In the following, an embodiment using wavelength (color) to encode the encryption key is described. The basic layout of FIG. 3 is adopted in this embodiment, but instead of using two identical crystals, the crystals are arranged so that they produce photon pairs of slightly different color as will be discussed in more detail below with reference to FIG. 5. This embodiment preferably removes the need for polarization elements, and is intrinsically robust against relative rotation between the transmitter and receiver.

The following example may be used. Suppose the pump device has a wavelength of Lp. By energy conservation, the photon pairs will be emitted about a wavelength of 2Lp. The first crystal can be arranged to emit a photon pair whose wavelengths are on either side of 2Lp (this is called non-degenerate SPDC). The second crystal can emit a photon pair slightly displaced from the wavelengths of photons generated by the first crystal.

The separation of the heralding photon from the encoding photon can be achieved by use of a short-pass filter, the shorter wavelength photons in any pair are transmitted to the receiver. The longer wavelength photons are directed to local detectors to be used as heralds for the encoding photons. These herald photons can be separated by the use of appropriate dichroic mirrors. At the receiver end, matching dichroic mirrors are used. This enables the same level of security as the use of polarization.

It is noted that this is only an example of how color encoding can be implemented. In principle, solid-state sources as generally described above with reference to FIG. 2 could be employed in different embodiments. A pulsed SPDC scheme as shown in FIG. 4 could also be used in different embodiments.

It is also noted that the use of two crystals is not the only method. A single SPDC crystal designed to produce a broadband color source can be split first by the short(long)-pass filter, and then split further by wavelength-division multiplexers just before the detectors. As long as the wavelength division multiplexers on the transmitters and receivers are coordinated, then heralding will be restored.

A notable point about embodiments using color encoding is that this can allow not only binary encoding, but also higher number bases, such as ternary and quartenary systems. The number of "sources" scales linearly with the number base, and is a straightforward route to increasing the key distribution rate. Finally, as color is not sensitive to rotation, this encoding scheme according to example embodiments is intrinsically robust to relative rotation between the transmitter and receiver.

Figure 5:
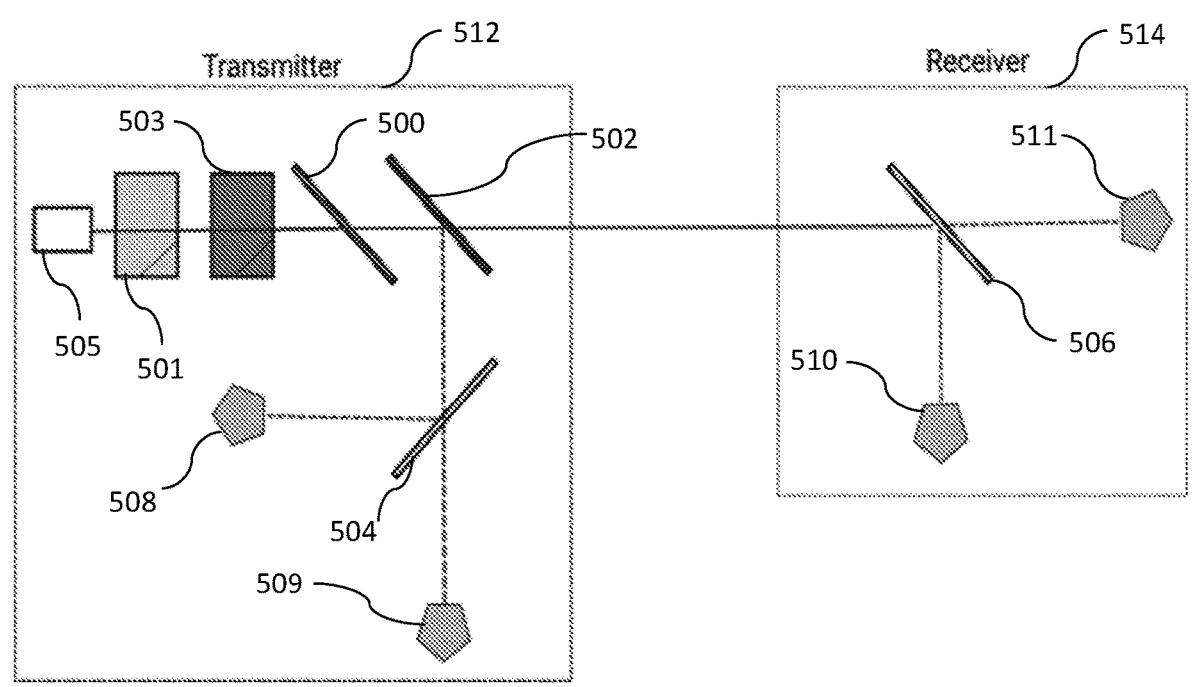
FIG. 5 is a schematic drawing of a transmitter and receiver configuration illustrating key distribution according to an example embodiment and single photons output generation according to an example embodiment.

FIG. 5 shows an implementation for color encoding according to an example embodiment. A beam dump 500 is provided for the pump from the pump device 505. A short-pass filter 502 and Dichroic mirrors 504, 506 are provided. In this embodiment, the photons of each pair of photons from both crystals are widely separated in wavelength (color). Hence, one photon of each pair can be separated from the other photon in that pair by the short-pass filter 502. On the other hand, overall the photon pairs from the first and second crystals 501, 503, respectively are only slightly separated. Therefore, amongst the heralding photons separated using the short-pass filter 502, these can be split using the dichroic mirrors 504, 506 just before the detectors 508-511. This preferably removes the need for polarization elements. It should be noted that the short-pass filter 502 can be replaced with a long-pass filter in a different embodiment and the protocol still works. An optical beacon (not shown) is assumed to be co-propagating with the single photons between transmitter 512 and receiver 514, as described above with reference to FIG. 2. The receiver 514 records the timing of the arrival of photons, and compares the timing with the recorded detection of the heralding photons at the transmitter 512 via an authenticated communication channel (compare numeral 218 in FIG. 2).

Other Sources of Single Photons for Use in SPDK According to Different Embodiments Apart from the embodiments described above with reference to FIGS. 3 to 5, embodiments of the present invention can use a number of other single photons sources described, for example as described in the literature. A promising class of candidates are solid state single photon emitters, ranging from quantum dots to defects in diamond, to more recent defects in two-dimensional materials systems. The important feature of these emitters is that they act as "artificial atoms", and when suitably triggered, they will emit a single photon. In particular, single photon emitters from diamond or hexagonal boron nitride are interesting because they have shown room temperature performance.

Virtually all solid-state single photon sources are currently at very low TRL, and not yet ready for integration into actual devices, but could come to play a prominent role in the future. It is noted that a single photon state may be approximated by the use of strongly attenuated lasers. These are known as weak coherent pulses and are a standard technique in existing QKD systems. Since this is an approximation however, while most pulses will consist of a single photons some will contain more than one photon. When used in QKD, a technique known as "decoy states" is used to mitigate this effect, and could also be applied to SPKD.

Consideration of Side-Channel Vulnerabilities

Similar to QKD, SPKD according to example embodiments is also vulnerable to side-channel attacks. The eavesdropper may attempt to exploit passive or active side-channels. In the case of passive eavesdropping, the tools employed will be very similar to existing electromagnetic (EM) intercept technologies. For example, the eavesdropper may build a synthetic aperture network of EM antennae to listen to the transmitter and detector apparatus without tampering with the single photons/quantum signal. This can be protected against by ensuring sufficient EM shielding according to example embodiments.

The eavesdropper may also be harvesting the quantum signals that have been scattered by the atmosphere. In the case where a true-single photon is used for encoding each bit of the encryption key, this gives no adversarial advantage—the lost bit is simply absent from the final encryption key. In the event that a weak coherent pulse-based source is used, a decoy state protocol would be sufficient to address this threat. In the case of the active eavesdropper, a likely form of attack is to control the detectors by actively inserting strong light to blind them, and then to activate them on-and-off by modulating this strong light. This method has been well understood, and several counter-measures exist to protect against this attack and these countermeasures would be equally applicable to SPKD.

It is noted that traditional QKD security proofs provide "unconditional" mathematical assurances by giving an eavesdropper full power over the quantum channel, but limiting their ability to exploit physical side-channels. Instead, a more practical form of key distribution according to example embodiments of the present invention takes into account the limits to which an eavesdropper can access the free-space optical link, while noting to consider that there are a plethora of side-channels that can be exploited. It has been discussed above how these constraints on an eavesdropper are reasonable from the perspective of FSO communication. Embodiments of the present invention combine the use of quantum properties of light, with practical constraints on the eavesdropper to access the quantum link, and this recognition leads to a simplified transmission and detection apparatus.

Figure 6:
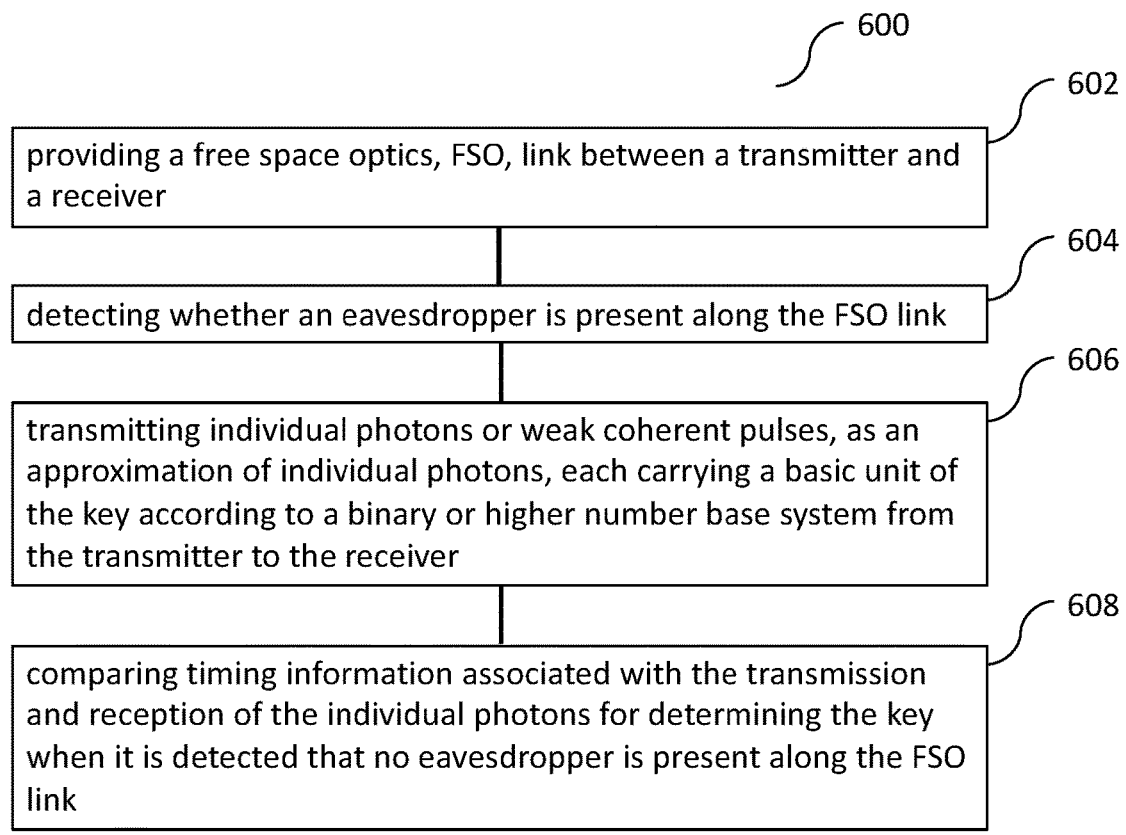
FIG. 6 shows a flow chart illustrating a method of key distribution according to an example embodiment.

FIG. 6 shows a flow chart 600 illustrating a method of key distribution according to an example embodiment. At step 602, a free space optics, FSO, link is provided between a transmitter and a receiver. At step 604, it is detected whether an eavesdropper is present along the FSO link. At step 606, individual photons or weak coherent pulses, as an approximation of individual photons, are transmitted, each encoding a basic unit of the key according to a binary or higher number base system from the transmitter to the receiver. At step 608, timing information associated with the transmission and reception of the individual photons is compared for determining the key when it is detected that no eavesdropper is present along the FSO link.

Transmitting the individual photons may comprise generating a mixture of photon pairs encoding different basic units, respectively, using Spontaneous Parametric Down-conversion, SPDC.

Generating the mixture of photon pairs may comprise using a single pump laser coupled to one or more nonlinear optical crystals, and the method may further comprise detecting one of the photons from each pair at the transmitter for generating the timing information associated with the transmission of the individual photons (heralding); and detecting the other photon from each pair at the receiver for decoding the basic unit and generating the timing information associated with the reception of the individual photons.

Generating the mixture of photon pairs may comprise using two pulsed pump lasers coupled to respective nonlinear optical crystals, and the method may further comprise monitoring which of the two pulsed pump lasers was used at what time incidence for generating the timing information associated with the transmission of the individual photon; transmitting only of the photons from each pair; and detecting the transmitted photon from each pair at the receiver for decoding the basic unit and generating the timing information associated with the reception of the individual photon.

The method may comprise generating single photons using one or more solid state single photon emitters.

The method may comprise using a decoy state system to mitigate an eavesdropper harvesting the quantum signals that have been scattered by the atmosphere when the method comprises transmitting the weak coherent pulses, as an approximation of individual photons.

Each photon may encode the basic unit of the key as a polarization state. The method may further comprise rotating the individual photons into circular polarization bases for transmission and out of the circular polarization bases for detection.

Each photon may encode the basic unit of the key as a wavelength state.

Figure 7:
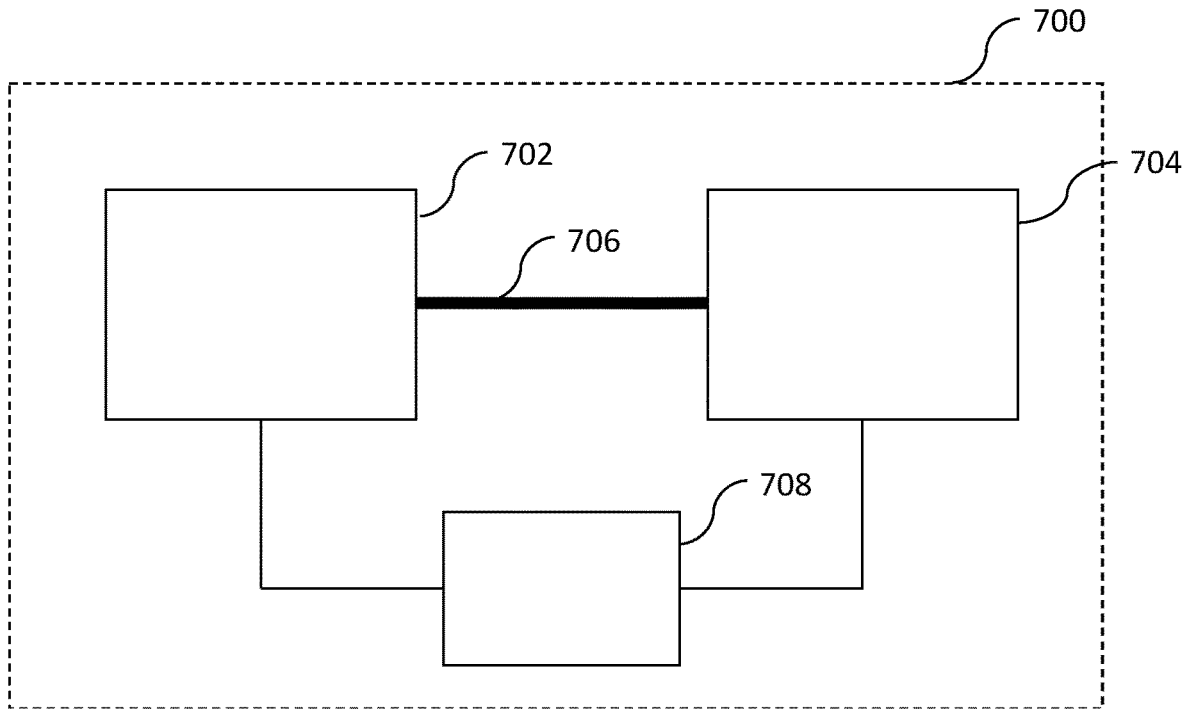
FIG. 7 shows a schematic drawing illustrating a key distribution system according to an example embodiment.

FIG. 7 shows a schematic drawing illustrating a key distribution system 700 according to an example embodiment, comprising a transmitter 702; a receiver 704; and a free space optics, FSO, link 706 between the transmitter and the receiver; wherein the transmitter 702 is configured to transmit individual photons or weak coherent pulses, as an approximation of individual photons, each encoding a basic unit of the key according to a binary or higher number base system from the transmitter to the receiver; and wherein the system 700 further comprises a key determination unit 708 coupled to the transmitter 702 and the receiver 704 and configured to compare timing information associated with the transmission and reception of the individual photons for determining the key when it is detected that no eavesdropper is present along the FSO link.

The transmitter 702 may be configured to generate a mixture of photon pairs encoding different basic units, respectively, using Spontaneous Parametric Downconversion, SPDC.

The transmitter 702 may comprise a single pump laser coupled to one or more nonlinear optical crystals for generating the mixture of photon pairs, and the key determination unit 708 may be configured to: detect one of the photons from each pair at the transmitter for generating the timing information associated with the transmission of the individual photons; and detect the other photon from each pair at the receiver for decoding the basic unit and generating the timing information associated with the reception of the individual photons.

The transmitter 702 may comprise two pulsed pump lasers coupled to respective nonlinear optical crystals for generating the mixture of photon pairs, the transmitter 702 further being configured to transmit only one of the photons from each pair, and the key determination unit 708 may be configured to: monitor which of the two pulsed pump lasers was used at what time incidence for generating the timing information associated with the transmission of the individual photon; and detect the transmitted photon from each pair at the receiver for decoding the basic unit and generating the timing information associated with the reception of the individual photon.

The transmitter 702 may comprise one or more solid state single photon emitters.

The system 700 may comprise a decoy state system to mitigate an eavesdropper harvesting the quantum signals that have been scattered by the atmosphere when the transmitter is configured to transmit the weak coherent pulses, as an approximation of individual photons.

Each photon may encode the basic unit of the key as a polarization state. The system 700 may further comprise a rotation unit for rotating the individual photons into circular polarization bases for transmission and out of the circular polarization bases for detection.

Each photon may encode the basic unit of the key as a wavelength state.

Figure 8:
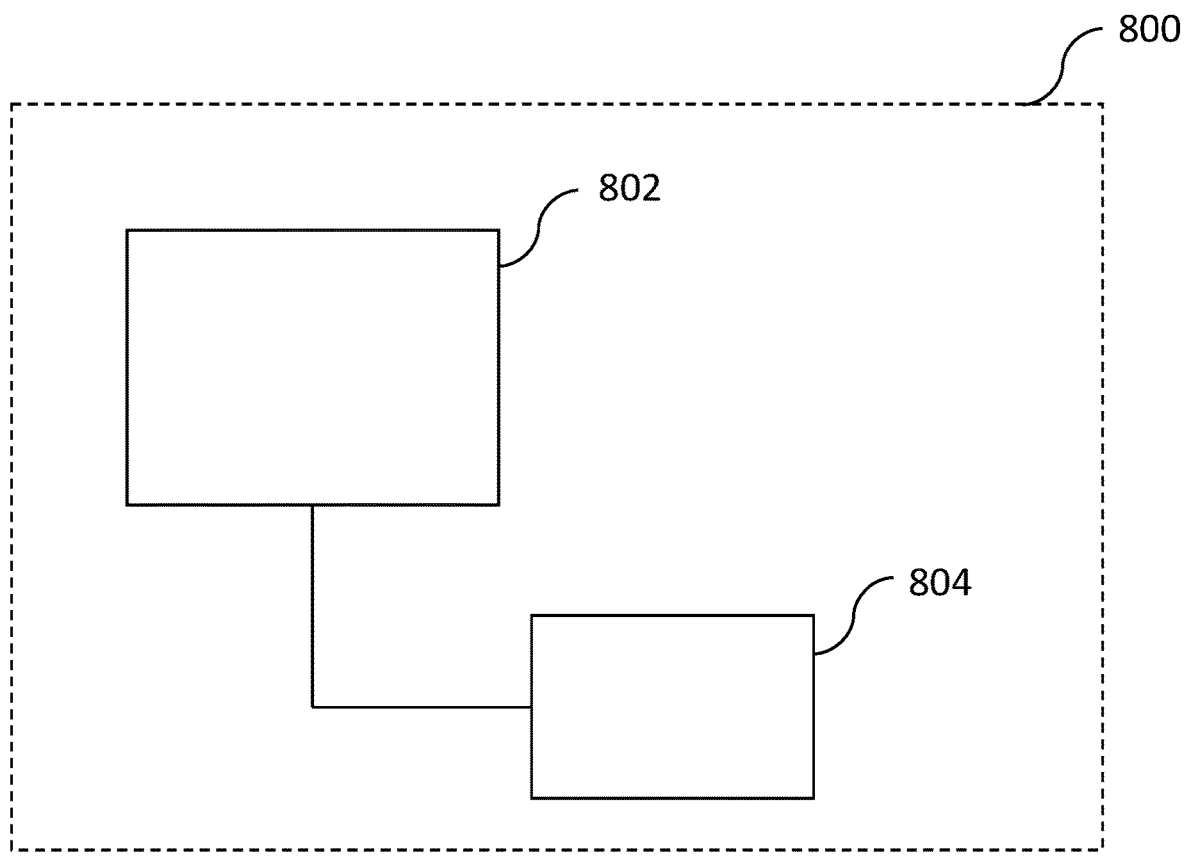
FIG. 8 shows a schematic drawing illustrating a single photon source system according to an example embodiment.

FIG. 8 shows a schematic drawings illustrating a single photon source system 800 according to an example embodiment, comprising: a source unit 802 for generating photon pairs using Spontaneous Parametric Downconversion, SPDC; and a timing unit 804 for generating timing information associated with the generation of the photon pairs; wherein the single photon source system 800 is configured to transmit only one of the photons from each pair as an output of the single photon source system 800.

The source unit 802 may be configured to generate a mixture of photon pairs encoding different basic units, respectively, according to a binary or higher number base system.

Each pair of photons may encode the basic unit as a polarization state. The system 800 may further comprise a polarizer element 806 for rotating the individual photons into circular polarization bases for transmission as the output of the single photon source system 800.

Each pair of photons may encode the basic unit as a wavelength state.

The source unit 802 may comprise a single pump laser coupled to one or more nonlinear optical crystals.

The timing unit 804 may comprise a detector configured to detect the other one of the photons from each pair for generating the timing information.

The source unit 802 may comprise two pulsed pump lasers coupled to respective nonlinear optical crystals. The timing unit 804 may comprise a monitor for monitoring which of the two pump lasers was used at what time incidence. The system may further comprise a wavelength dependent element for transmitting only the one of the photons from each pair as an output of the single photon source system.

Figure 9:
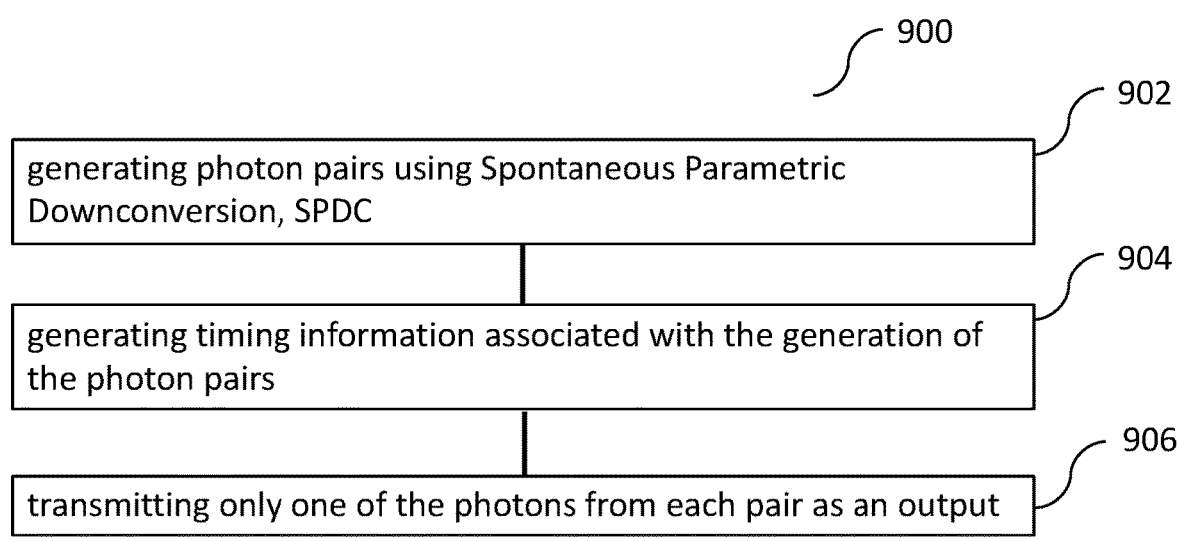
FIG. 9 shows a flow chart illustrating a method of generating single photons, according to an example embodiment.

FIG. 9 shows a flow chart 900 illustrating a method of generating single photons, according to an example embodiment. At step 902, photon pairs are generated using Spontaneous Parametric Downconversion, SPDC. At step 904, timing information associated with the generation of the photon pairs is generated. At step 906, only one of the photons from each pair is transmitted as an output.

The method may comprise generating a mixture of photon pairs encoding different basic units, respectively, according to a binary or higher number base system.

Each pair of photons may encode the basic unit as a polarization state. The method may further comprise rotating the individual photons into circular polarization bases for transmission as the output of the single photon source system.

Each pair of photons may encode the basic unit as a wavelength state.

The method may comprise using a single pump laser coupled to one or more nonlinear optical crystals. The method may comprise detecting the other one of the photons from each pair for generating the timing information.

The method may comprise using two pulsed pump lasers coupled to respective nonlinear optical crystals. The method may comprise monitoring which of the two pump lasers was used at what time incidence. The method may further comprise using a wavelength dependent element for transmitting only the one of the photons from each pair as an output.

Embodiments of the present invention an have one or more of the following features and associated benefit/advantage:

| Feature | Benefit/Advantage |
| --- | --- |
| Threat Model. | Embodiments of the present invention utilize an insight into the nature of FSO technology, whereby an eavesdropper is prevented from having unfettered access to the quantum link. At most the eavesdropper can receive photons that have been scattered away from the receiver. This makes the threat model very different from that used in regular QKD. Specifically, embodiments of the present invention demonstrate that the man-in-the-middle can be revealed by direct observation or use of auxiliary sensors. Furthermore, embodiments of the present invention describe how the beamsplitter attack can be overcome by encoding with single photons. |
| Free Space Optics Technology. | Embodiments of the present invention are applicable to key distribution techniques where a stream of single photons is transmitted and received using FSO technology. This includes fixed sites, such as between two buildings, or other stationary locations. Such technology is especially relevant for moving platforms such as satellites, aircraft, ships, ground vehicles and personal mobility devices. |
| Transmission and detection is performed at the single photon level. | Embodiments of the present invention describe key distribution where the transmission and detection is performed at the single photon level. By employing single photon sources, photons that are lost by atmospheric scattering do not convey any information to an eavesdropper. |
| Encoding is performed in a single basis. | Embodiments of the present invention encode the encryption key into a single basis. For example in polarization, this can be the right and left circular polarization basis. In contrast, in traditional QKD, the encoding must be done randomly into two bases: for example, right/left and horizontal/vertical. This is to confuse the eavesdropper, but it also means that the end-users must sacrifice half the transmitted signal. Thus embodiments of the present invention intrinsically double the key delivery rate. |
| Rotation tolerant encoding. | The use of a single polarization basis according to example embodiments enables rotation tolerant encoding, once near-circular polarization bases are adopted. Furthermore, encoding in wavelength (color) can enable rotation tolerant encoding. |

As mentioned above, by proper implementation of counter measures, the key distribution apparatus according to example embodiments can be hardened against the same side-channel attacks that affect standard QKD systems using existing counter measures.

Embodiments of the present invention can be applied for any key distribution technology using FSO. Non limiting examples are:
 a. between fixed locations.
 b. between a ground location and a moving platform (whether ground, air, marine or space).
 c. between platforms moving in relation to each other in a maritime, or aerospace environment.
 d. between aircraft or drones in an ad-hoc air-to-air network.
 e. between personal mobility devices in an ad-hoc network.
 f. between satellites.

In areas where ad-hoc networks are utilised with mobile nodes, this places further constraints on the ability of the eavesdropper to conduct man-in-the-middle attacks.

Aspects of the systems and methods described herein, such as, but not limited to, the key determination unit 708 for obtaining the timing information of the photons and comparison processing to agree on the key, and the timing unit 804 for generating timing information associated with the generation of the photon pairs, may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

We claim:

1. A method of key distribution comprising the steps of:
 providing a free space optics, FSO, link between a transmitter and a receiver;
 detecting whether an eavesdropper is present along the FSO link;
 transmitting individual photons or weak coherent pulses, as an approximation of individual photons, each encoding a basic unit of the key according to a binary or higher number base system from the transmitter to the receiver; and
 comparing timing information associated with the transmission and reception of the individual photons for determining the key when it is detected that no eavesdropper is present along the FSO link.

2. The method of claim 1, wherein transmitting the individual photons comprises generating a mixture of photon pairs encoding different basic units, respectively, using Spontaneous Parametric Downconversion, SPDC.

3. The method of claim 2, wherein generating the mixture of photon pairs comprises using a single pump laser coupled to one or more nonlinear optical crystals, and the method further comprises:
 detecting one of the photons from each pair at the transmitter for generating the timing information associated with the transmission of the individual photons; and
 detecting the other photon from each pair at the receiver for decoding the basic unit and generating the timing information associated with the reception of the individual photons;
or wherein generating the mixture of photon pairs comprises using two pulsed pump lasers coupled to respective nonlinear optical crystals, and the method further comprises:
 monitoring which of the two pulsed pump lasers was used at what time incidence for generating the timing information associated with the transmission of the individual photon;
 transmitting only one of the photons from each pair; and
 detecting the transmitted photon from each pair at the receiver for decoding the basic unit and generating the timing information associated with the reception of the individual photon.

4. The method of claim 1, comprising generating single photons using one or more solid state single photon emitters, and/or wherein each photon encodes the basic unit of the key as a wavelength state.

5. The method of claim 1, comprising using a decoy state system to mitigate an eavesdropper harvesting the quantum signals that have been scattered by the atmosphere when the method comprises transmitting the weak coherent pulses, as an approximation of individual photons.

6. The method claim 1, wherein each photon encodes the basic unit of the key as a polarization state and optionally further comprising rotating the individual photons into circular polarization bases for transmission and out of the circular polarization bases for detection.

7. A key distribution system comprising:
   a transmitter;
   a receiver; and
   a free space optics, FSO, link between the transmitter and the receiver;
   wherein the transmitter is configured to transmit individual photons or weak coherent pulses, as an approximation of individual photons, each encoding a basic unit of the key according to a binary or higher number base system from the transmitter to the receiver; and
   wherein the system further comprises a key determination unit configured to compare timing information associated with the transmission and reception of the individual photons for determining the key when it is detected that no eavesdropper is present along the FSO link.

8. The system of claim 7, wherein the transmitter is configured to generate a mixture of photon pairs encoding different basic units, respectively, using Spontaneous Parametric Downconversion, SPDC.

9. The system of claim 8, wherein the transmitter comprises a single pump laser coupled to one or more nonlinear optical crystals for generating the mixture of photon pairs, and the key determination unit is configured to:
   detect one of the photons from each pair at the transmitter for generating the timing information associated with the transmission of the individual photons; and
   detect the other photon from each pair at the receiver for decoding the basic unit and generating the timing information associated with the reception of the individual photons;
   or wherein the transmitter comprises two pulsed pump lasers coupled to respective nonlinear optical crystals for generating the mixture of photon pairs, the transmitter further being configured to transmit only one of the photons from each pair, and the key determination unit is configured to:
   monitor which of the two pulsed pump lasers was used at what time incidence for generating the timing information associated with the transmission of the individual photon; and
   detect the transmitted photon from each pair at the receiver for decoding the basic unit and generating the timing information associated with the reception of the individual photon.

10. The system of claim 1, wherein the transmitter comprises one or more solid state single photon emitters, and/or wherein each photon encodes the basic unit of the key as a wavelength state.

11. The system of claim 1, comprising a decoy state system to mitigate an eavesdropper harvesting the quantum signals that have been scattered by the atmosphere when the transmitter is configured to transmit the weak coherent pulses, as an approximation of individual photons.

12. The system of claim 7, wherein each photon encodes the basic unit of the key as a polarization state, and optionally further comprising a rotation unit for rotating the individual photons into circular polarization bases for transmission and out of the circular polarization bases for detection.

\* \* \* \* \*

UNITED STATES PATENT AND TRADEMARK OFFICE
CERTIFICATE OF CORRECTION

PATENT NO. : 11,303,361 B2
APPLICATION NO. : 16/960641
DATED : April 12, 2022
INVENTOR(S) : Euk Jin Alexander Ling, Robert Bedington and James Anthony Grieve It is certified that error appears in the above-identified patent and that said Letters Patent is hereby corrected as shown below:

In the Claims

In Column 18, Line 18 (Claim 10, Line 1), replace "1," with --7,--.
In Column 18, Line 22 (Claim 11, Line 1), replace "1," with --7,--.

Signed and Sealed this
Twenty-eighth Day of June, 2022

Katherine Kelly Vidal
*Director of the United States Patent and Trademark Office*